United States Patent
Nunez et al.

(10) Patent No.: US 9,915,723 B1
(45) Date of Patent: Mar. 13, 2018

(54) GEOGRAPHIC LOCATOR RESPONSIVE TO DATA PACKET ATTRIBUTES

(71) Applicant: INTERNATIONAL BUSINESS MACHINES CORPORATION, Armonk, NY (US)

(72) Inventors: Meller Javier Perez Nunez, San Jose (CR); Franz Friedrich Liebinger Portela, Heredia (CR); Ricardo Golcher Ugalde, San Jose (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/461,955

(22) Filed: Mar. 17, 2017

(51) Int. Cl.
*H04W 24/00* (2009.01)
*G01S 5/06* (2006.01)
*H04W 4/02* (2018.01)
*H04L 29/08* (2006.01)
*H04W 84/12* (2009.01)
*H04W 88/08* (2009.01)

(52) U.S. Cl.
CPC ........... *G01S 5/06* (2013.01); *H04L 67/10* (2013.01); *H04L 67/18* (2013.01); *H04W 4/023* (2013.01); *H04W 4/025* (2013.01); *H04W 84/12* (2013.01); *H04W 88/08* (2013.01)

(58) Field of Classification Search
USPC ..................................................... 455/456.3
See application file for complete search history.

(56) References Cited

U.S. PATENT DOCUMENTS

| | | |
|---|---|---|
| 7,174,243 B1 | 2/2007 | Lightner et al. |
| 7,433,694 B2 | 10/2008 | Morgan et al. |
| 2011/0037619 A1 | 2/2011 | Ginsberg et al. |
| 2015/0032291 A1 | 1/2015 | Lowrey et al. |

OTHER PUBLICATIONS

Peter Mell et al, The NIST Definition of Cloud Computing, National Institute of Standards and Technology, Publication 800-145, 2011.

*Primary Examiner* — Joel Ajayi
(74) *Attorney, Agent, or Firm* — Patrick J. Daugherty; Driggs, Hogg, Daugherty & Del Zoppo Co., LPA

(57) ABSTRACT

Aspects receive different instances of reception data from different respective wireless communication receivers that include broadcast data packets broadcast from a mobile device, geographic locations of the communication receivers and times of reception of the broadcast data packet by the respective receivers. Each broadcast data packet includes a time of broadcast by the mobile device and a unique identifier of the mobile device. Aspects determine a geographic location of the mobile device at the time of broadcast of the data packets as a function of triangulating to the geographic locations of the different communication receivers; and/or of determining a Doppler shift in frequency transmission data of an instance of reception of a first data packet relative to frequency transmission data of another instance of reception of another, second data packet transmission broadcast at a different time than the first data packet.

17 Claims, 5 Drawing Sheets

GEOGRAPHIC LOCATOR RESPONSIVE TO DATA PACKET ATTRIBUTES

BACKGROUND

Global positioning satellite (GPS) components and systems are commonly used by mobile programmable devices (for example, smart phone, tablet, automobile navigation and anti-theft devices, etc.) to determine their geographic location, based on time and the known position of GPS satellites in communication with the mobile device, wherein GPS satellites continuously transmit their current time and position to the mobile device as receiver. A GPS receiver generally monitors communications with multiple satellites and determines a precise position of the receiver based on differences in time for data to move between the respective satellites, the known locations of the satellites, and deviation from true time.

Alternatives to GPS systems for determining the location of a mobile device include control plane locating and "Near Location Based Services" (NLBS). With control plane locating, sometimes referred to as "positioning", a mobile phone service provider determines general area locations of a cell phone based on the radio signal delay of the closest cell-phone towers, for example as probably within or outside of the boundaries of a city or other defined area. Near LBS (NLBS) generally uses low energy and limited-range technologies such as Bluetooth®, wide local area network (WLAN), infrared, radio frequency identifier (RFID), co-pilot beacon data for CDMA networks and other near field communication technologies, to match devices as most proximate, nearby service nodes having known locations. (BLUETOOTH is a trademark of Bluetooth SIG, Inc. in the United States or other countries.) NLBS relies on accessing location information from nodes in their immediate surroundings, and is commonly used inside buildings and other closed premises or restricted or regional areas, wherein a device may be located within different zones defined by the wireless communication range of respective nodes.

SUMMARY

In one aspect of the present invention, a computerized method for determining mobile device locations as a function of broadcast data packet attributes includes executing steps on a computer processor. Thus, a computer processor receives from a first wireless communication receiver first reception instance data that includes a first broadcast data packet received by the first wireless communication receiver, a geographic location of the first wireless communication receiver and a time of reception of the first broadcast data packet by the first wireless communication receiver, wherein the first broadcast data packet is broadcast from a mobile device and comprises a unique identifier of the mobile device and a time of broadcast of the first data packet by the mobile device. The processor further receives from a second wireless communication receiver second reception instance data including the first broadcast data packet received by the second wireless communication receiver, a geographic location of the second wireless communication receiver that is different from the geographic location of the first wireless communication receiver, and a time of reception of the first broadcast data packet by the second wireless communication receiver. Thus, the processor determines a geographic location of the mobile device at the time of broadcast of the first data packet by the mobile device as a function of triangulating to the geographic location of the first wireless communication receiver and to the geographic location of the second wireless communication receiver; and/or determining a Doppler shift in frequency transmission data of the first instance of reception of the first data packet relative to frequency transmission data of another instance of reception of a second data packet transmission by the first wireless communication receiver, wherein a time of broadcast of the second data packet transmission by the mobile device is different from the time of broadcast of the first data packet.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to receive from a first wireless communication receiver first reception instance data that includes a first broadcast data packet received by the first wireless communication receiver, a geographic location of the first wireless communication receiver and a time of reception of the first broadcast data packet by the first wireless communication receiver, wherein the first broadcast data packet is broadcast from a mobile device and comprises a unique identifier of the mobile device and a time of broadcast of the first data packet by the mobile device. The processor is further configured to receive from a second wireless communication receiver second reception instance data including the first broadcast data packet received by the second wireless communication receiver, a geographic location of the second wireless communication receiver that is different from the geographic location of the first wireless communication receiver, and a time of reception of the first broadcast data packet by the second wireless communication receiver. Thus, the processor is configured to determine a geographic location of the mobile device at the time of broadcast of the first data packet by the mobile device as a function of triangulating to the geographic location of the first wireless communication receiver and to the geographic location of the second wireless communication receiver; and/or determining a Doppler shift in frequency transmission data of the first instance of reception of the first data packet relative to frequency transmission data of another instance of reception of a second data packet transmission by the first wireless communication receiver, wherein a time of broadcast of the second data packet transmission by the mobile device is different from the time of broadcast of the first data packet.

In another aspect, a computer program product for determining mobile device locations as a function of broadcast data packet attributes has a computer-readable storage medium with computer readable program code embodied therewith. The computer readable hardware medium is not a transitory signal per se. The computer readable program code includes instructions for execution which cause the processor to receive from a first wireless communication receiver first reception instance data that includes a first broadcast data packet received by the first wireless communication receiver, a geographic location of the first wireless communication receiver and a time of reception of the first broadcast data packet by the first wireless communication receiver, wherein the first broadcast data packet is broadcast from a mobile device and comprises a unique identifier of the mobile device and a time of broadcast of the first data packet by the mobile device. The processor is further caused to receive from a second wireless communication receiver second reception instance data including the first broadcast data packet received by the second wireless communication receiver, a geographic location of the second wireless communication receiver that is different from the geographic location of the first wireless communication receiver, and a time of reception of the first broadcast data packet by the second wireless communication receiver. Thus, the processor is further caused to determine a geographic location of the mobile device at the time of broadcast of the first data packet by the mobile device as a function of triangulating to the geographic location of the first wireless communication receiver and to the geographic location of the second wireless communication receiver; and/or determining a Doppler shift in frequency transmission data of the first instance of reception of the first data packet relative to frequency transmission data of another instance of reception of a second data packet transmission by the first wireless communication receiver, wherein a time of broadcast of the second data packet transmission by the mobile device is different from the time of broadcast of the first data packet.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
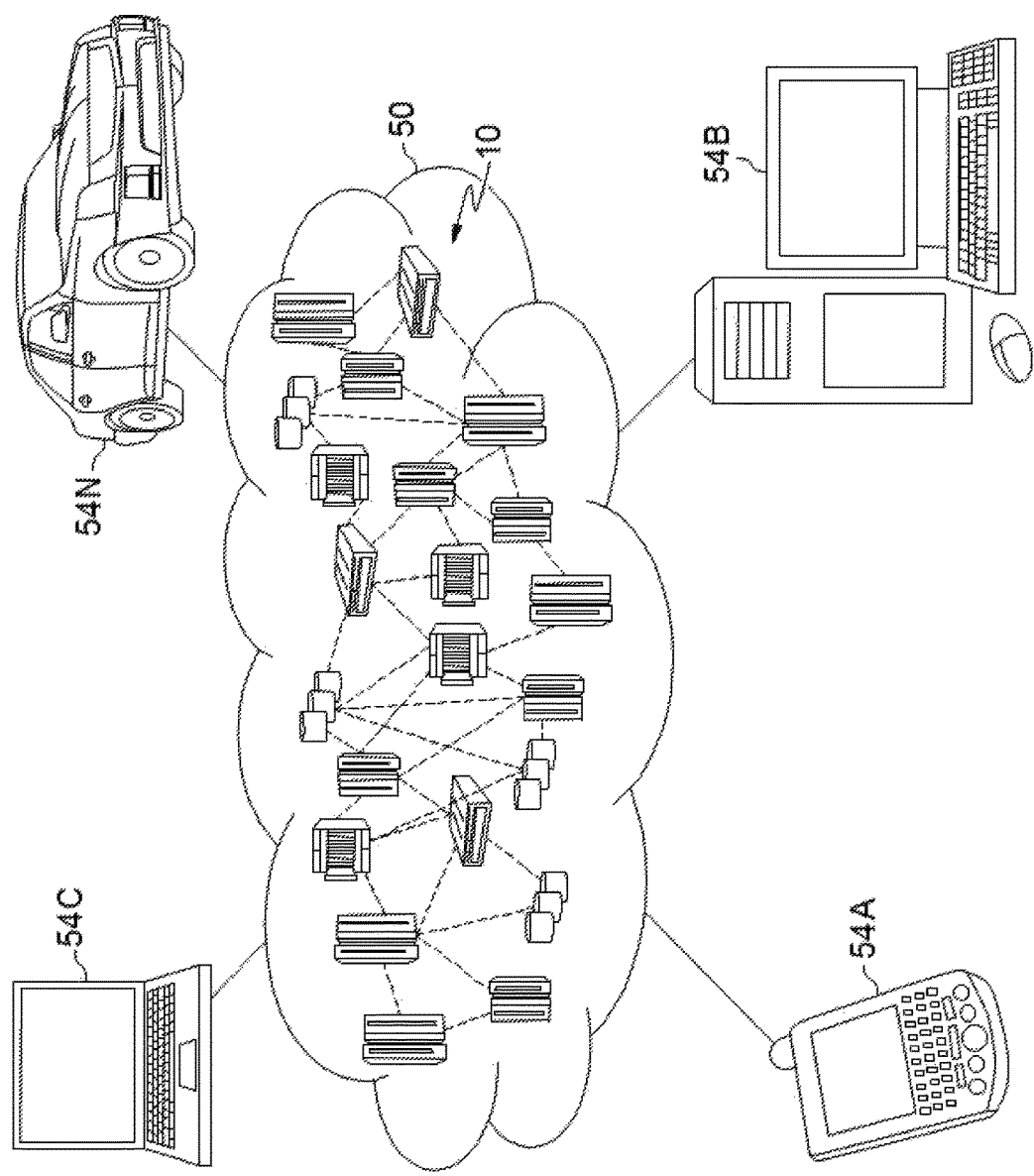
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
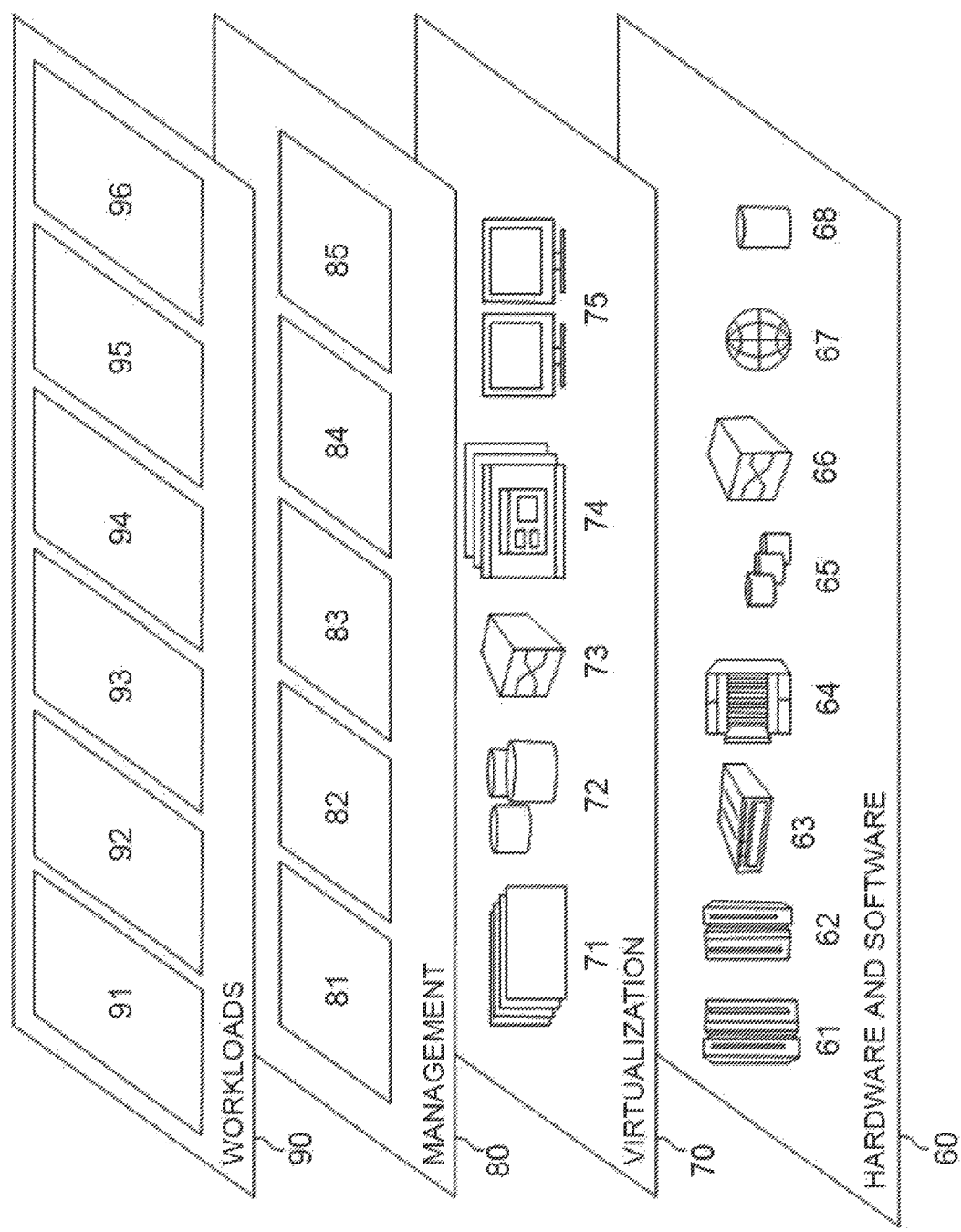
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for determining mobile device locations as a function of broadcast data packet attributes 96.

Figure 3:
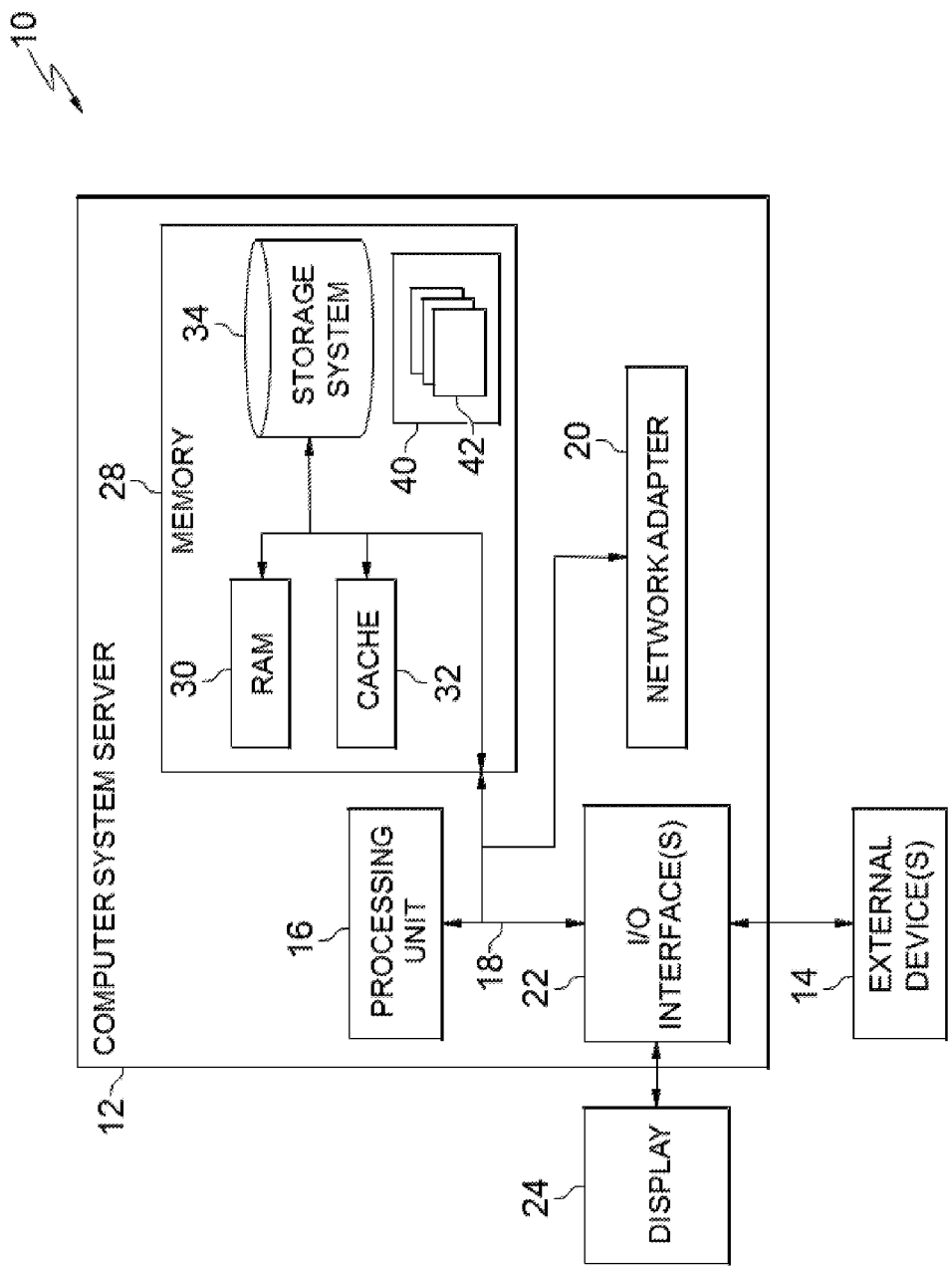
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
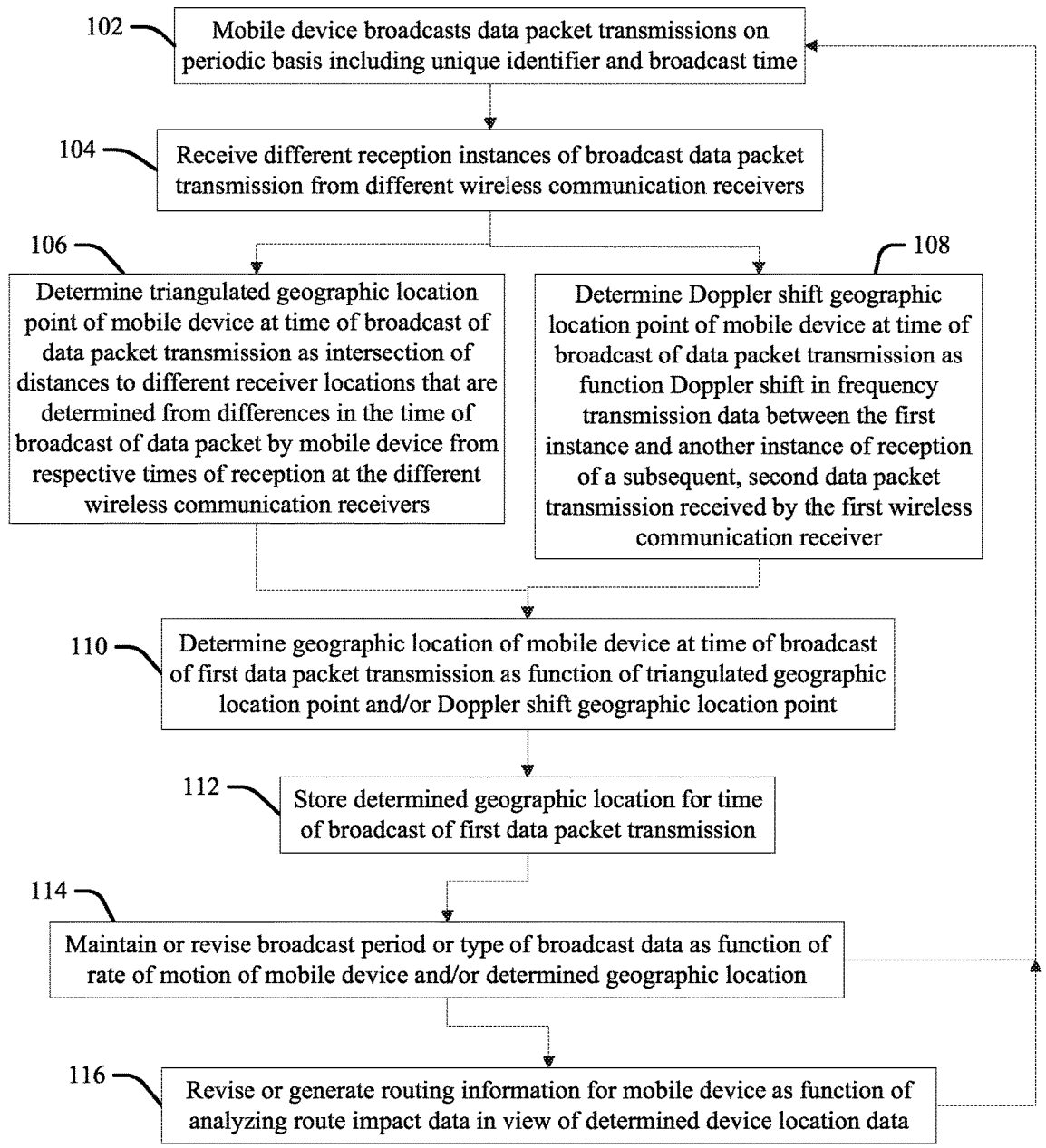
FIG. 4 is a flow chart illustration of an embodiment of the present invention.

FIG. 4 illustrates a process or system according to the present invention for determining mobile device locations as a function of broadcast data packet attributes. At 102 a mobile device broadcasts to wireless communication receivers configured to communicate with the mobile device, on a periodic basis, packet data transmissions that each comprise a unique identifier of the mobile device and different respective broadcast time data. Examples of the wireless communication receivers include GPS satellites that are in communication with the mobile device via a GPS data component of the mobile device; cellular service towers that are in communication with the mobile device via a cellular data component of the mobile device; radio signal antennae that are configured to modulated radio wavelength transmission communications from the mobile device; WiFi nodes that are in communication with the mobile device via a local area network or wide area network nodes; BLUETOOTH nodes that are in communication with the mobile device via a local area network or wide area network BLUETOOTH nodes; and still other wireless communication receivers appropriate for use practicing aspects of the present invention will be apparent to one skilled in the art.

A processor configured according to an aspect of the present invention (the "configured processor") is in communication with a plurality of the different wireless communication receivers that are configured to receive the broadcast packet data transmissions. At 104 the configured processor receives, from two different ones (first and second) of the wireless communication receivers, different respective (first and second) reception instances of one (a first) of the broadcast data packet transmissions. The configured processor may be implemented in accordance with the computer system server 10 of FIG. 3, including as the cloud node 10 of FIG. 1, as described respectively above.

More particularly, at 104 the configured processor receives from the first wireless communication receiver first reception instance data comprising the first broadcast data packet received by the first wireless communication receiver, a geographic location of the first wireless communication receiver and a time of reception of the first broadcast data packet by the first wireless communication receiver; and from the second wireless communication receiver, the second reception instance data comprising the first broadcast data packet received by the second wireless communication receiver, a geographic location of the second wireless communication receiver (that is different from the geographic location of the first wireless communication receiver), and a time of reception of the first broadcast data packet by the second wireless communication receiver.

At 106, in response to further receiving from a third wireless communication receiver third reception instance data at 104 that comprises the first broadcast data packet received by the third wireless communication receiver, a geographic location of the third wireless communication receiver (that is different from the geographic locations of the first and second wireless communication receivers) and a time of reception of the first broadcast data packet by the third wireless communication receiver, the configured processor determines a triangulated geographic location point of the mobile device at the time of broadcast of the first data packet transmission. The triangulated geographic location point is determined via triangulation processing of the first, second and third location data: namely, solving for a geographic location point as an intersection of distances to each of the different respective locations of the first, second and third receivers that are determined as functions of differences in time of the broadcast transmission of the data packet by the mobile device, and respective times of reception of the data packet at each of the three receiver locations. In some aspects, the determination at 106 is similar to triangulation location processes executed by GPS devices in communication with three different GPS satellites, but wherein the configured processor, located remotely from the mobile device, executes the process steps, rather than a processor located on the mobile device.

The first, second and third receivers are not limited to a same type of receiver, but each may be selected from different types of receivers (satellites, WiFi nodes, cell phone towers and networks, radio antennae systems, etc.), wherein the configured processor is configured to communicate with each of the different types of receivers, enabling the mobile device to interact with the configured processor thereby. The configured processor receives information from the different receivers that includes data enabling the configured processor to calculate and determine (triangulate) the mobile device position at the time that signals are received by the different receivers.

At 108, in response to receiving another (fourth) instance of a subsequent (second) of the broadcast data packets at the first receivers, wherein the received first instances of the first data packet and the fourth instance of the second data packet each comprise frequency transmission data, the configured processor determines a Doppler shift geographic location point of the mobile device at the time of broadcast of the first data packet transmission as a function of determining a Doppler shift in the frequency transmission data of the instance of reception of the first data packet relative to the frequency transmission data of the fourth instance of reception of the second data packet transmission.

In some aspects, the different periodic (first and second) data packet transmissions have different frequency ranges or other profile data, further enabling the configured processor to determine location points from Doppler effect observations, such as via processes used to process analog radio beacons.

At 110 the configured processor determines the geographic location of mobile device at time of broadcast of first data packet transmission as a function of one or both of the triangulated geographic location point and Doppler shift geographic location point. The configured processor may average the respective location values, including by weighting of the values higher than the other; or one of the triangulated and Doppler shift geographic location points may be selected, with the other used to set a tolerance for precision of the location; and still other location determinations will be apparent to one skilled in the art.

When broadcast data packet signals are received by WiFi or cell service receivers, a handshake generally occurs that provides additional data useful to the configured processor to pinpoint the transmitting device location at 110. Aspects also consider internet service provider (ISP) Domain Name System (DNS) address data at 110 to narrow down location searching activities, for example to define a general location of a WiFi access point (AP) or internet-enabled cell service node, as well as providing a means to route telemetry information back to the configured processor that includes signal strength and deviations from the standard carrier waves that are useful in triangulating location determinations. Aspects thus transform existing communication infrastructures into reverse GPS systems and processes.

In some aspects of the present invention either of the triangulated geographic location point determination processes and outputs at 106 and the Doppler shift geographic location point determination processes and outputs at 108 are optional, or omitted, during consideration and processing of any given periodic data packet transmission by the mobile device received at step 102. Thus, the geographic location determined for the mobile device at the time of broadcast of a data packet transmission at 110 may be based on only one of the triangulated geographic location point and the Doppler shift geographic location point.

At 112 the configured processor stores the geographic location determined for the mobile device at the time of broadcast of first data packet transmission (to a tangible memory storage device, to a cloud storage device, etc.)

At 114 the configured processor confirms (maintains), or revises, the current type of broadcast data transmission, and/or broadcast period utilized by the mobile device to broadcast data packet transmissions at 102, as function of determining the geographic location of the device, and/or determining a rate of motion of the mobile device. Thus, aspects revise or chose the time period between transmission broadcasts (or data pulses) for the mobile device at 114 as a function of determining the speed of movement of the mobile device from different locations determined for different packet transmissions. For example, when deployed on a moving vehicle the mobile device may determine its rate of motion and adjust time periods between data packet broadcasts as needed to ensure that a sufficient number or frequency or transmissions are broadcast to enable the configured processor to continuously determine different locations associated with each broadcast within a specified granularity or tolerance (for example, to set the mobile device to broadcast new packets every second in response to determining that the vehicle is moving at 500 meters/second, and a desired or specified location granularity is at least 500 meters from a previous location determination).

The configured processor may also pause periodic broadcasting by the mobile device at 114, or set a long period of time to elapse before a next broadcast, in response to determining that the mobile device is stationary, or is scheduled or likely to stationary during the set time period. For example, the configured processor causes the mobile device to pause broadcasts from 12:00 AM to 5:00 AM, in response to a determination from historic data or user preferences that the user of the mobile device is at home and sleeping during these hours.

The configured processor may also increase the period of the mobile device packet transmissions at 114 from a default period (for example, five seconds) to a longer period (for example, one minute, five minutes, etc.) in response to determining from a series of location determinations that the mobile device is stationary, until the configured processor determines that the mobile device is in motion, wherein the default or speed and distance appropriate period is reapplied or established. Such configurations provide energy efficiencies, for example allowing battery-powered mobile devices to conserve battery power when stationary, or moving slowly, etc. that would otherwise be consumed by more frequent data packet transmissions. Increasing energy efficiency also helps to ensure that transmission data may be refreshed in a small amount, such as in response to determining an interruption or intermittent function of the processes or associated systems used by aspects of the present invention to track mobile devices via remotely-located configured processors.

Aspects may also revise or select a type of periodic broadcast transmission at 114 to correlate with intended target wireless communication receivers selected as a function of determining the current location of the device, transmitting different kinds of data according to their current context or whereabouts. For example, in response to determining that the mobile device is within a city that offers multiple (two or more) wireless communication receiver options selected from cellular towers and local area WiFi nodes, the configured processor may signal the mobile device to use only lower power transmitter components to broadcast the data packet transmissions to cellular telephone networks and WiFi access point receivers, thereby saving power and computational resources relative to broadcasting to more distant GPS satellites.

In contrast, in response to determining that the mobile device is located too far from cellular towers and local area WiFi nodes to successfully send packet data to them (as is often the case with ships at sea or airplanes in flight), the configured processor instructs the mobile device at 114 to stop expending resources on cellular or WiFi transmissions, and to instead broadcast only to GPS or other satellite resources.

At 116 the configured processor revises or generates routing information for the mobile device as a function of analyzing route impact data in view of determined device location data. More particularly, the configured processor processes the stored positioning information along with navigation routing information data received from a variety of different sources. Illustrative but not limiting or exhaustive examples include 911 emergency and other short-term traffic alerts; bridge, sidewalk, bike path closures; notices of fire department or other safety force activities impacting or blocking traffic at certain locations; current and predicted weather conditions that impact the ability of a user carrying the mobile device from following a route (rain, snow, ice storms, hurricanes, etc.); smart traffic control system pattern schedules that dynamically alter or deploy time or condition-dependent basis changes to high-density vehicle lane options or lane direction changes (for example, during specific rush-hour time periods, special event durations etc.); and still other relevant data will be apparent to one skilled in the art.

Figure 5:
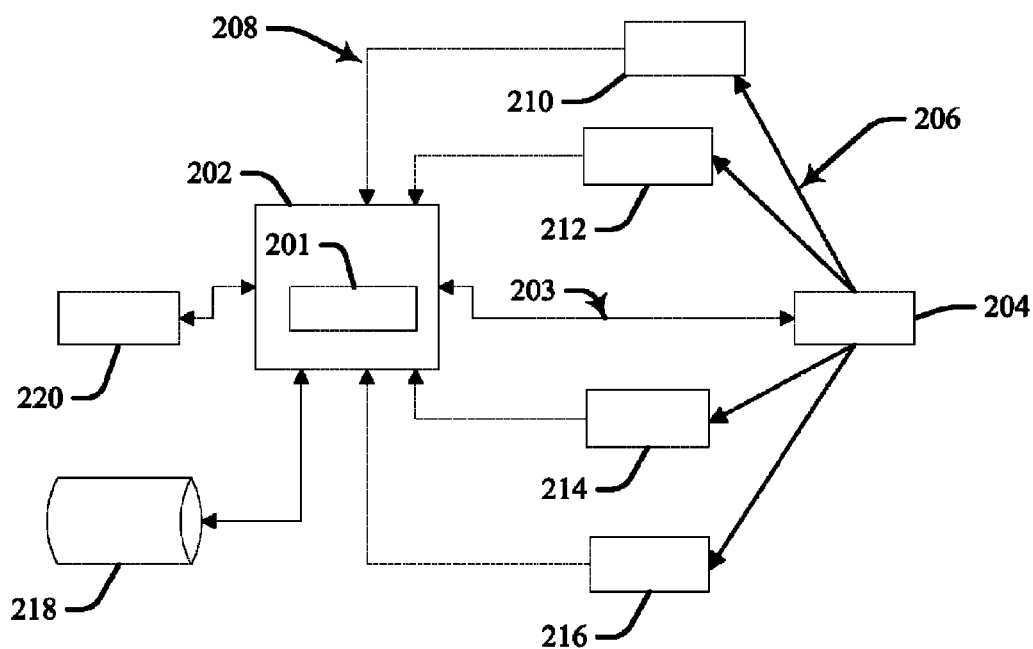
FIG. 5 is a block diagram illustration of an embodiment of the present invention.

FIG. 5 illustrates a computer server or other system 202 with a processor 201 configured according to the present invention (a "configured processor") that is in circuit communication 203 with a mobile device 204. The mobile device 204 broadcasts on a periodic basis (at 102, FIG. 4) packet data transmissions each comprising a unique identifier of the mobile device 204 and different respective broadcast time stamp data to each of four different wireless communication receivers on appropriate communication channels 206: to a GPS satellite receiver 210, a cellular service tower receiver 212, a WiFi node 214 and a radio antenna receiver 216.

The server 202 is in communication 208 with each of the four different wireless communication receivers 210, 212, 214 and 216, and the configured processor 201 thereby acquires the broadcast packet data transmissions received by each and generates respective location data for the mobile device 204 with respect to each (by associating their respective received instances of data packet transmissions with their times of reception and their respective geographic locations, at of the first wireless communication receiver, at 104, FIG. 4).

The configured processor 201 further determines triangulated (at 106, FIG. 4) and Doppler shift (at 108, FIG. 4) geographic location data for the mobile device 204, and thereby the location of the device for each packet transmission (at 110, FIG. 4), which it stores (at 112, FIG. 4) in a storage device 218. The configured processor 201 uses the communication link 203 to maintain or revise the data packet broadcast period, or the type data broadcast by the mobile device 204 as function of rate of motion of mobile device and/or determined geographic location (at 114, FIG. 4).

The configured processor 201 is also in communication with an analytic resource 220 that enables the configured processor 201 to revise or generate routing information for the mobile device 204 as a function of analyzing route impact data in view of determined device location data (at 116, FIG. 4).

Aspects of the present invention provide advantages over prior art, mobile device-based location processes and systems. Current GPS systems generally perform location trilateration on the device being tracked, wherein the device itself calculates its own location position via communication with GPS satellites. However, when the prior art mobile device terminates such self-tracking processes, current positioning and location information data is lost, as is common when a vehicle or user carrying the device becomes lost or missing. This leads to delays, or failures, in determining current or last known or probable locations of lost airplanes, automobile, boats, hikers, back-country skiers, etc. In contrast, aspects of the present invention remotely and continually track and store location information for a mobile device on a periodic basis, defining reverse GPS processes that constantly determine and save location data on a periodic basis, providing an accurate location estimate in the event communication with the mobile device is lost.

Some aspects feed the periodically determined and stored data into other, big data analytic system solutions, leveraging virtually unlimited cloud resource to enable determinations and predictions of the last known and current positions for any mobile device periodically broadcasting data transmissions according to the present invention that are much more robust and quickly determined relative to those possible via the more limited processing capabilities of the mobile device itself. Thus, aspects may more quickly determine a likely current location after contact with the device is lost, via extrapolating travel speed and direction, in view of historic movement data for the device or for similar devices, users, etc., thereby plotting better routing paths relative to prior art systems. Via communications with the mobile device aspects may provide individuals with more accurate positioning information (via extrapolating to a current position from a last known position), as well as further improve the timely execution of successful rescue and recovery missions.

Aspects use big data analytics engines to generate a holistic view of device location determinations from a myriad of different data sources, thereby analyzing possible route scenarios, load-balancing traffic, and selecting and providing only relevant information to operators, controllers and service providers. Some aspects optimize route selection by the mobile devices by determining routing that is not duplicative to routes commonly assigned by prior art GPS systems, thereby avoiding congestion on busy routes that would otherwise be caused by selecting conventional or popular routes.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining mobile device locations as a function of broadcast data packet attributes, comprising executing on a computer processor the steps of:
receiving from a first wireless communication receiver first reception instance data comprising a first broadcast data packet received by the first wireless communication receiver, a geographic location of the first wireless communication receiver and a time of reception of the first broadcast data packet by the first wireless communication receiver, wherein the first broadcast data packet is broadcast from a mobile device and comprises a unique identifier of the mobile device and a time of broadcast of the first data packet by the mobile device;
receiving from a second wireless communication receiver second reception instance data comprising the first broadcast data packet received by the second wireless communication receiver, a geographic location of the second wireless communication receiver that is different from the geographic location of the first wireless communication receiver, and a time of reception of the first broadcast data packet by the second wireless communication receiver; and
determining a geographic location of the mobile device at the time of broadcast of the first data packet by the mobile device as a function of:
triangulating to the geographic location of the first wireless communication receiver and to the geographic location of the second wireless communication receiver; and
determining a Doppler shift in frequency transmission data of the first instance of reception of the first data packet relative to frequency transmission data of another instance of reception of a second data packet transmission by the first wireless communication receiver wherein a time of broadcast of the second data packet transmission by the mobile device is different from the time of broadcast of the first data packet; and
wherein the triangulating to the geographic location of the first wireless communication receiver and to the geographic location of the second wireless communication receiver comprises triangulating an intersection of respective distances to the geographic location of the first wireless communication receiver and to the geographic location of the second wireless communication receiver that are determined as functions of differences in the time of broadcast of the first data packet by the mobile device from the respective times of reception of the first data packet at the first wireless communication receiver and at the second wireless communication receiver.

2. The method of claim 1, wherein the first and second wireless communication receivers are different types of receivers selected from a group of receiver types consisting of satellite receivers, WiFi nodes, cell phone towers and radio antenna receivers.

3. The method of claim 1, wherein the geographic location of the first wireless communication receiver is determined from attribute data of the first instance that is selected from the group consisting of a handshake between the first wireless communication receiver and the mobile device, and an internet service provider domain name system address of the first wireless communication receiver.

4. The method of claim 1, further comprising:
triangulating to the geographic location of the first wireless communication receiver as a function of telemetry information routed from the first wireless communication receiver that includes signal strength and deviations from standard carrier waves.

5. The method of claim 1, wherein the mobile device broadcasts on a periodic basis a plurality of data packets that include the first data packet and the second data packet, the method further comprising:
revising a time period used to define the periodic basis as a function of determining a speed of movement of the mobile device from different locations determined for different times of the packet transmissions.

6. The method of claim 1, further comprising:
causing the mobile device to use a low power transmitter component to broadcast data packets in transmissions to a cellular telephone network wireless receiver or a WiFi access point wireless receiver, in response to determining that a current location of the mobile device offers multiple wireless communication receiver options selected from cellular towers and local area WiFi nodes.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the steps of receiving from the first wireless communication receiver the first reception instance data, receiving from the second wireless communication receiver the second reception instance data and determining the geographic location of the mobile device at the time of broadcast of the first data packet by the mobile device.

8. The method of claim 7, wherein the computer-readable program code is provided as a service in a cloud environment.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
receives from a first wireless communication receiver first reception instance data comprising a first broadcast data packet received by the first wireless communication receiver, a geographic location of the first wireless communication receiver and a time of reception of the first broadcast data packet by the first wireless communication receiver, wherein the first broadcast data packet is broadcast from a mobile device and comprises a unique identifier of the mobile device and a time of broadcast of the first data packet by the mobile device;
receives from a second wireless communication receiver second reception instance data comprising the first broadcast data packet received by the second wireless communication receiver, a geographic location of the second wireless communication receiver that is different from the geographic location of the first wireless communication receiver, and a time of reception of the first broadcast data packet by the second wireless communication receiver; and determines a geographic location of the mobile device at the time of broadcast of the first data packet by the mobile device as a function of:

triangulating to the geographic location of the first wireless communication receiver and to the geographic location of the second wireless communication receiver; and determining a Doppler shift in frequency transmission data of the first instance of reception of the first data packet relative to frequency transmission data of another instance of reception of a second data packet transmission by the first wireless communication receiver wherein a time of broadcast of the second data packet transmission by the mobile device is different from the time of broadcast of the first data packet; and wherein the processor executes the program instructions stored on the computer-readable storage medium via the computer readable memory and thereby triangulates to the geographic location of the first wireless communication receiver and to the geographic location of the second wireless communication receiver comprises triangulating an intersection of respective distances to the geographic location of the first wireless communication receiver and to the geographic location of the second wireless communication receiver that are determined as functions of differences in the time of broadcast of the first data packet by the mobile device from the respective times of reception of the first data packet at the first wireless communication receiver and at the second wireless communication receiver.

10. The system of claim 9, wherein the first and second wireless communication receivers are different types of receivers selected from a group of receiver types consisting of satellite receivers, WiFi nodes, cell phone towers and radio antenna receivers.

11. The system of claim 9, wherein the processor executes the program instructions stored on the computer-readable storage medium via the computer readable memory and thereby determines the geographic location of the first wireless communication receiver from attribute data of the first instance that is selected from the group consisting of a handshake between the first wireless communication receiver and the mobile device, and an internet service provider domain name system address of the first wireless communication receiver.

12. The system of claim 9, wherein the processor executes the program instructions stored on the computer-readable storage medium via the computer readable memory and thereby triangulates to the geographic location of the first wireless communication receiver as a function of telemetry information routed from the first wireless communication receiver that includes signal strength and deviations from standard carrier waves.

13. The system of claim 9, wherein the mobile device broadcasts on a periodic basis a plurality of data packets that include the first data packet and the second data packet; and wherein the processor executes the program instructions stored on the computer-readable storage medium via the computer readable memory and thereby revises a time period used to define the periodic basis as a function of determining a speed of movement of the mobile device from different locations determined for different times of the packet transmissions.

14. A computer program product for determining mobile device locations as a function of broadcast data packet attributes, the computer program product comprising:

a computer readable storage medium having computer readable program code embodied therewith, wherein the computer readable storage medium is not a transitory signal per se, the computer readable program code comprising instructions for execution by a processor that cause the processor to:

receive from a first wireless communication receiver first reception instance data comprising a first broadcast data packet received by the first wireless communication receiver, a geographic location of the first wireless communication receiver and a time of reception of the first broadcast data packet by the first wireless communication receiver, wherein the first broadcast data packet is broadcast from a mobile device and comprises a unique identifier of the mobile device and a time of broadcast of the first data packet by the mobile device;

receive from a second wireless communication receiver second reception instance data comprising the first broadcast data packet received by the second wireless communication receiver, a geographic location of the second wireless communication receiver that is different from the geographic location of the first wireless communication receiver, and a time of reception of the first broadcast data packet by the second wireless communication receiver; and determine a geographic location of the mobile device at the time of broadcast of the first data packet by the mobile device as a function of:

triangulating to the geographic location of the first wireless communication receiver and to the geographic location of the second wireless communication receiver; and determining a Doppler shift in frequency transmission data of the first instance of reception of the first data packet relative to frequency transmission data of another instance of reception of a second data packet transmission by the first wireless communication receiver wherein a time of broadcast of the second data packet transmission by the mobile device is different from the time of broadcast of the first data packet; and wherein the computer readable program code instructions for execution by the processor cause the processor to triangulate to the geographic location of the first wireless communication receiver and to the geographic location of the second wireless communication receiver by triangulating an intersection of respective distances to the geographic location of the first wireless communication receiver and to the geographic location of the second wireless communication receiver that are determined as functions of differences in the time of broadcast of the first data packet by the mobile device from the respective times of reception of the first data packet at the first wireless communication receiver and at the second wireless communication receiver.

15. The computer program product of claim 14, wherein the computer readable program code instructions for execution by the processor further cause the processor to determine the geographic location of the first wireless communication receiver from attribute data of the first instance that is selected from the group consisting of a handshake between the first wireless communication receiver and the mobile device, and an internet service provider domain name system address of the first wireless communication receiver.

16. The computer program product of claim 14, wherein the computer readable program code instructions for execution by the processor further cause the processor to triangulate to the geographic location of the first wireless communication receiver as a function of telemetry information routed from the first wireless communication receiver that includes signal strength and deviations from standard carrier waves.

17. The computer program product of claim 14, wherein the mobile device broadcasts on a periodic basis a plurality of data packets that include the first data packet and the second data packet; and wherein the computer readable program code instructions for execution by the processor further cause the processor to revise a time period used to define the periodic basis as a function of determining a speed of movement of the mobile device from different locations determined for different times of the packet transmissions.

* * * * *